(12) United States Patent
Holder

(10) Patent No.: US 12,375,117 B2
(45) Date of Patent: Jul. 29, 2025

(54) COORDINATE FRAME PROJECTION USING MULTIPLE UNIQUE SIGNALS TRANSMITTED FROM A LOCALIZED ARRAY OF SPATIALLY DISTRIBUTED ANTENNAS

(71) Applicant: Propagation Research Associates, Inc., Marietta, GA (US)

(72) Inventor: Ernest Jefferson Holder, Canton, GA (US)

(73) Assignee: Propagation Research Associates LLC, Marietta, GA (US)

( * ) Notice: Subject to any disclaimer, the term of this patent is extended or adjusted under 35 U.S.C. 154(b) by 472 days.

(21) Appl. No.: 18/047,087

(22) Filed: Oct. 17, 2022

(65) Prior Publication Data

US 2024/0128993 A1    Apr. 18, 2024

(51) Int. Cl.
*H04B 1/38*      (2015.01)
*G01S 13/02*      (2006.01)
(Continued)

(52) U.S. Cl.
CPC ................ *H04B 1/38* (2013.01); *H04B 1/18* (2013.01)

(58) Field of Classification Search
CPC ... H04B 1/06; H04B 1/16; H04B 1/18; H04B 1/38; H04B 7/185; H04B 7/18502;
(Continued)

(56) References Cited

U.S. PATENT DOCUMENTS 5,260,709 A * 11/1993 Nowakowski .......... F41G 7/346
342/357.44
5,614,913 A * 3/1997 Nichols .................. G01C 15/00
342/357.29
(Continued)

OTHER PUBLICATIONS

Younger, J.P et al.; Interferometer Angle-of-Arrival Determination Using Precalculated Phases, Sep. 1, 2017, Radio Sc., 52, pp. 1058-1066, doi:10.1002/2017RS006284.
(Continued)

*Primary Examiner* — Quochien B Vuong
(74) *Attorney, Agent, or Firm* — Smith Tempel Blaha LLC; Robert A. Blaha

(57) ABSTRACT

A method includes receiving, with an antenna-receiver connected to a platform in a group of platforms, a set of uniquely identifiable signals transmitted from respective antennas separate from the platform; defining a first coordinate frame using the location of the antennas; determining, with a platform processor in communication with the at least one antenna-receiver, a position of the platform in the first coordinate frame, the platform processor identifying the position of the platform using one or more characteristics of the uniquely identifiable signals; generating, with the platform processor, a transformation from a coordinate frame defined by the group of platforms to the first coordinate frame; and receiving information at each of the platforms regarding a non-cooperative target. The transformation from a coordinate frame defined by the platforms to the first coordinate frame enables engagement systems and tracking sensors to extend their effective operating range.

21 Claims, 11 Drawing Sheets

(51) Int. Cl.
  *G01S 13/42* (2006.01)
  *H04B 1/18* (2006.01)

(58) Field of Classification Search
  CPC ............ H04B 7/18504; H04B 7/18506; H04B 7/18508; H04B 7/1851; H04B 7/18513; G01S 13/00; G01S 13/003; G01S 13/02; G01S 13/42; G01S 5/14
  See application file for complete search history.

(56) References Cited

U.S. PATENT DOCUMENTS

| | | | |
|---|---|---|---|
| 7,338,009 B1* | 3/2008 | Bobinchak | ............ F41G 7/2253 244/3.1 |
| 8,120,526 B2 | 2/2012 | Holder | |
| 8,610,041 B1* | 12/2013 | Boardman | ............ G01S 13/883 342/61 |
| 8,854,252 B2 | 10/2014 | Holder | |
| 9,696,418 B2 | 7/2017 | Holder | |
| 10,571,224 B2 | 2/2020 | Holder | |
| 11,018,705 B1 | 5/2021 | Holder | |
| 11,199,380 B1 | 12/2021 | Ekhaus et al. | |
| 11,555,889 B2 | 1/2023 | Grigsby et al. | |
| 2005/0027450 A1* | 2/2005 | Cox | ........................ G01S 19/50 342/357.68 |
| 2020/0191529 A1 | 6/2020 | Holder | |

OTHER PUBLICATIONS

Balogh L. et al.; Angle of Arrival Estimation Based on Interferometer Principle, WISP 2003, Budapest Hungary, Sep. 4-6, 2003, pp. 219-223.

* cited by examiner

COORDINATE FRAME PROJECTION USING MULTIPLE UNIQUE SIGNALS TRANSMITTED FROM A LOCALIZED ARRAY OF SPATIALLY DISTRIBUTED ANTENNAS

TECHNICAL FIELD

Embodiments of the present invention relate to arrangements and methods for identifying characteristics of remote objects.

BACKGROUND ART

Many modern military systems and commercial navigation systems rely on a global positioning system (GPS) to provide precise positioning to achieve effective performance. However, in a global conflict a GPS may not be available. As such, some have developed electronic devices for controllably maneuvering remote vehicles when GPS is not available for example in tunnels, indoors, or outdoors when interfering noise and signals are present. These electronic devices called inertial measurement units (IMUs) use a combination of accelerometers and gyroscopes to sense attitude and velocity changes.

IMUs are often incorporated into an inertial navigation system (INS) which uses the IMU measurements to calculate attitude, angular rates, linear velocity, and position relative to a global reference frame. However, reliance on IMU technology for orientation of weapon platforms and commercial navigation systems has several disadvantages. A significant disadvantage in using IMUs is they suffer from accumulated error. A guidance system using IMU technology is continually integrating acceleration over time to calculate velocity and position. Measurement errors, however small, are accumulated over time. These accumulated errors lead to an ever-increasing difference between where the IMU is reporting that it is located and its actual location relative to the reference frame. Due to integration a constant error in acceleration results in a linear error in velocity and a quadratic error growth in position. A constant error in attitude rate, as determined from a gyroscope, results in a quadratic error in velocity and a cubic error growth in position. This fundamental disadvantage with IMU-based systems is aggravated by the expense associated with producing accurate and robust IMUs coupled with the expectation that in the case of military weapon systems IMUs are desired to survive while producing accurate results over long-range missions in high g launch and operational environments.

An alternative positioning technology that provides enhanced position and orientation accuracy is described in (U.S. Patent Application Publication 20090167607 A1 and U.S. Pat. No. 8,120,526 B2). The described system uses multiple simultaneous orthogonal waveforms transmitted from multiple distributed apertures to implement a bistatic interferometer with a receiver located on the weapon platforms.

The angular accuracy of the bistatic interferometer is inversely proportional to the baseline distance between transmit aperture where distance is defined by the number of transmit frequency wavelengths and the square root of the signal-to-noise ratio (SNR). Range is determined by measuring the time the waveform is received at each bistatic receiver given knowledge of the time of transmit and given the transmitter and receiver clocks are synchronized. The system establishes a local inertial frame defined by the plane of the transmit aperture and the normal to that plane in which all bistatic receivers track their position. Given range and angle of a remotely located platform measured with the bistatic receiver on the platform, accurate self-location is determined in the local inertial frame.

SUMMARY

There may be a need to extend the effectiveness of the alternative positioning system in a reliable and robust manner.

Arrangements of separately located components and methods for frame projection are provided.

A method includes the steps receiving, with at least one antenna-receiver connected to a respective platform of a group of platforms, a set of uniquely identifiable signals transmitted from respective spatially-distributed antennas separate from the respective platform; defining a first coordinate frame using the location of the spatially distributed antennas; determining, with a platform processor in communication with the at least one antenna-receiver, a position of the respective platform in the first coordinate frame, wherein the platform processor identifies the position of the respective platform using one or more characteristics of the uniquely identified signals received by the at least one antenna-receiver; determining, with the platform processor, a third coordinate frame defined by the respective positions of the at least one antenna receiver on the group of platforms; generating, with the platform processor, a transformation from the third coordinate frame to the first coordinate frame; transmitting, with at least one ranging sensor transceiver connected to the respective platform, a respective platform unique signal; and receiving, with at least one ranging sensor receiver connected to the respective platform, a reflected version of the respective platform unique signal, wherein the reflected version of the platform unique signal is reflected from a non-cooperative target.

According to a further aspect, there is described a method including the steps of receiving, with at least one antenna-receiver connected to a platform in a group of platforms, a set of uniquely identifiable signals transmitted from respective spatially-distributed antennas separate from the platform; defining a first coordinate frame using the location of the spatially distributed antennas; determining, with a platform processor in communication with the at least one antenna-receiver, one or more of a position, a motion, and an orientation of the platform in the first coordinate frame, wherein the platform processor identifies at least one of the position, motion and orientation of the platform using one or more characteristics of the uniquely identified signals received by the at least one antenna-receiver; generating, with the platform processor, a second coordinate frame responsive to the relative positions of the at least one antenna-receiver connected to the platform and at least one additional antenna-receiver connected to the platform; and generating, with the platform processor, a transformation from the second coordinate frame to the first coordinate frame.

These methods describe a process that projects the first coordinate frame defined by the spatially distributed antennas by generating additional coordinate frames and transformations from these additional frames to the first frame, respectively, allowing engagement systems and tracking sensors to extend their effective operating range. In many cases the first coordinate frame is operating as an inertial frame thereby frame projection is establishing a projected inertial frame that is sometimes necessary for effective operations. The projection is enabled by the spatially distributed antennas using uniquely identifiable waveforms to allow antennas/receivers and communicatively coupled processors on forward based platforms to self-locate in the first coordinate frame.

OVERVIEW OF EMBODIMENTS

Both military systems such as indirect fire ground-to-ground weapons and commercial navigation systems can be improved through frame projection to achieve mission success absent the expense and error drift associated with IMUs especially in extended engagement systems that operate over long range beyond the horizon of available supporting assets. In an example arrangement, a local inertial frame, defined by spatially distributed antennas (a multiple antenna illuminator), is rotated or converted into a second frame based on other sensor frames. These other sensor frames can be defined by the relative location of distributed sensors connected to a remote platform such as an aircraft. Suitable aircraft include manned or unmanned fixed wing and multiple rotor drones or platforms. In the case of a fixed-wing aircraft sensors may be deployed proximal to the tips of the wings as well as fore and aft of the wing along the fuselage. The sensors arranged along the wing may define a first axis of a second coordinate frame. The sensors arranged along the fuselage define a second axis orthogonal to the first axis of the second coordinate frame. A third axis of the second coordinate frame is defined by a vector orthogonal to the geometric plane defined by the first and the second axes of the second coordinate frame. In some arrangements, sensors may include optical sensors deployed on platforms along with a set of antenna-receivers arranged to operate in the radio-frequency spectrum.

A group of three or more remote platforms self-determine their position in the first coordinate frame defined by the location of the spatially distributed antenna arrays based on the received unique signals transmitted from the spatially distributed antennas. One or more characteristics of the uniquely identified signals received by at least one antenna-receiver located on a respective platform is applied together with triangulation techniques to identify a platform position in the first coordinate frame.

In one example arrangement, each of the members of a group of platforms is equipped with a sensor that determines an angle defined by the relative position of two other members of the group of platforms with respect to one of the members. These respective angles define a projected third geometric plane in the first coordinate system. A vector orthogonal to the projected third geometric plane completes a projected third frame. When the sensors are passive devices such as optical receivers that operate in the infrared region of the electromagnetic spectrum, the second coordinate frame enables each platform in the group of platforms to determine a respective orientation in the first coordinate frame. The respective sensors deployed for determining angles based on the locations of the remaining platforms in the group of platforms may operate in the electromagnetic or acoustic spectrums.

In the example arrangement, the group of platforms will share range information in the first coordinate frame concerning a non-cooperative target within line-of-sight of the group of platforms but not necessarily within line-of-sight of the spatially distributed array of transmitters used to define the locations of the platforms in the first coordinate frame.

The group of platforms may share information about the location of the non-cooperative target in the established inertial frame relative to the first coordinate frame. The group of platforms may share this information with a cooperative target. Alternatively, some members of the group of platforms may share information with one or more master platforms that use respective platform processors to determine the location of the non-cooperative target. The one or more master platforms may include a transceiver for communicating information concerning the location and motion on the non-cooperative target in the first coordinate frame or a global reference frame relative to the first coordinate frame. The cooperative target can use the received information signal as an input to a controller for directing the cooperative target relative to the non-cooperative target.

In an alternative arrangement, each platform is equipped with a ranging sensor that determines distance to remote objects based on time of arrival of an optical or radio-frequency signal when the signal transmit time is known. In this alternative arrangement, the members of the group of platforms self-determine their position in the first coordinate frame defined by the location of the spatially distributed antenna arrays based on the received unique signals transmitted from the spatially distributed antennas. One or more characteristics of the uniquely identified signals received by at least one antenna-receiver located on a respective platform is applied together with triangulation techniques to identify a platform position in the first coordinate frame.

The above-described second coordinate frame that enables each platform to determine its orientation in the first coordinate frame is not required when trilateration techniques are used to determine the location of a non-cooperative target. Information signals from each member of the group of platforms including the location of the respective platform in the first coordinate frame and the range or distance between each respective platform and the non-cooperative target are communicated to a cooperative target.

The above-described third coordinate frame, in this embodiment defined by the self-determined locations of the respective platforms in the first coordinate frame, enables a cooperative target within signal range of the group of platforms and arranged with a cooperative target processor to determine the location of the non-cooperative target in the first coordinate frame. In this regard, reflected ranging signals transmitted from each member of the group of platforms and received at a compatible sensor/receiver located on the cooperative platform enable the cooperative target processor to determine the location of the non-cooperative target.

In another alternative arrangement, each platform is equipped with a ranging sensor that determines distance to remote objects based on time of arrival of an optical or radio-frequency signal when the signal transmit time is known. In this alternative arrangement, the members of the group of platforms self-determine their position in the first coordinate frame defined by the location of the spatially distributed antenna arrays based on the received unique signals transmitted from the spatially distributed antennas. One or more characteristics of the uniquely identified signals received by at least one antenna-receiver located on a respective platform is/are applied together with triangulation techniques to identify a platform position in the first coordinate frame.

In addition, the platforms communicate with each other sharing respective range information based on time of arrival of optical or radio-frequency signals transmitted from the respective platforms and reflected by the non-cooperative target when the signal transmit time is known.

The above-described second coordinate frame that enables each platform to determine its orientation in the first coordinate frame is not required when trilateration techniques are used to determine the location of a non-cooperative target. Information signals from each member of the group of platforms including the location of the respective platform in the first coordinate frame and the range or distance between each respective platform and the non-cooperative target are communicated to a cooperative target.

The above-described third coordinate frame, in this embodiment defined by the self-determined locations of the respective platforms in the first coordinate frame, enables a cooperative target within signal range of the group of platforms and arranged with a cooperative target processor to determine the location of the non-cooperative target in the first coordinate frame. In this regard, reflected ranging signals transmitted from each member of the group of platforms and received at a compatible sensor/receiver located on the cooperative platform enable the cooperative target processor to determine the location of the non-cooperative target.

In the context of the present document, the term "platform" may particularly denote any support structure capable of accommodating one or more antenna-receivers and one or more sensors. In preferred embodiments, platforms are aerial vehicles operated within line-of-sight of a multiple-antenna illuminator and separated in space from one another.

In the context of the present document, the term "antenna-receiver" denotes the interface between electromagnetic waves propagating through space and electrical signals in a usable form.

In the context of this document, the term "uniquely-identifiable signals" denotes a set of signals where each instance of a particular signal includes one or more characteristics in the nature of the propagating waveform or in the information coded therein that distinguishes each signal or the information coded therein from the other signals of the set.

In the context of this document, the term "coordinate frame" denotes points designated by distance along a set of respective axes from a reference point where the respective axes are arranged orthogonally with respect to each other. In preferred embodiments, coordinate frames define three-dimensional space from respective reference points.

In the context of this document, the term "inertial frame" denotes an abstract coordinate system whose directions, origin, and scale are specified by a set of geometric reference points whose positions are mathematically and physically identified. For example, an earth-centered inertial frame is a fixed global reference frame with an origin at the center of the earth. By way of further example, an East-North-Up inertial frame is defined by a plane tangent to the earth's surface where a y-axis points to true North, a z-axis points away from the interior of the earth, and an x-axis points East.

In the context of this document, the term "non-cooperative target") denotes an aircraft or missile and in some embodiments may even be a terrestrial-based vehicle that is not within a line of sight extending from the transmitters of the spatially distributed antenna arrays but is within a line of sight of a group of platforms.

In the context of this document, the term "cooperative target" denotes a projectile or vehicle arranged with one or more antenna-receivers for receiving a signal or signals. A received signal will be directly transmitted from one or more platforms or indirectly (i.e., reflected) by a non-cooperative target. In preferred embodiments, the projectile or vehicle is arranged with a control system that can direct flight or operation relative to a non-cooperative target.

In the context of this document, the term "triangulation" denotes a geometric and/or a trigonometric process of determining the location of an object by forming triangles to the point from a set of known points. In this regard, triangulation involves the use of angle measurements from known points.

In the context of this document, the term "trilateration" denotes a geometric and/or a trigonometric process of determining the location of an object by measuring distances from a set of known points.

In the context of this document, the term "platform unique signal" denotes a signal originating from a specific platform from the group of platforms where one or more characteristics in the nature of the propagating waveform or in the information coded therein distinguishes the signal as originating only from the specific platform.

In the described embodiments, it should be appreciated that guidance of the cooperative target with respect to the non-cooperative target occurs in the first coordinate frame which is the only inertial frame. The second coordinate frame (of each respective) UAV or platform is in motion relative to the motion of the UAV or platform in the first coordinate frame. Similarly, the third coordinate frame defined by a constellation or group of platforms is in motion relative to the motion of the group of platforms with respect to the first coordinate frame. The array of antennas that transmit unique waveforms defining the first coordinate frame enable the projection of the first coordinate frame forward to the platforms which deploy EO/IR and ranging applications.

Frame Projection with Optical Sensors

In an embodiment, a coordinate frame defined by the positions of antenna-transmitters spatially separate from each other, is projected using one or more optical or infrared (IR) sensors. The optical sensors may include sensor systems commonly referred to light detection and ranging (LiDAR) systems. While optical sensors are responsive to light, IR sensors are responsive to heat or thermal energy generated by target. When using optical sensors, a second coordinate frame, defined by spatial relationships of antenna-receivers located in known positions on the platform, enable the platform to determine its orientation in the coordinate frame defined by the antenna-transmitters when those transmitters transmit uniquely identifiable signals.

One or more optical sensors connected to a platform receive information concerning a position of a non-cooperative signal relative to the platform. The information about the location of the non-cooperative target relative to the platform enables a processor arranged on the platform to determine a position of the non-cooperative target in an established inertial frame (i.e., the first coordinate frame) defined by the spatially distributed antenna arrays.

In these embodiments, one or more sensors located on separate platforms receive respective signals used to determine angles to the remaining platforms when determining a third coordinate frame different from the first coordinate frame and the second coordinate frame. The one or more sensors on the separate platforms operate in one of the electromagnetic and the acoustic spectrum. When such sensors respond to incident optical information the platforms must remain in line-of-sight with respect to one another. The different platforms will be arranged with optical sources that generate different optical signals from each of the other optical sources throughout the group of optical sources distributed across the platforms. Similarly, when such sensors operate acoustically the different platforms will be arranged with acoustic sources that generate different sound signals from each of the other acoustic sources throughout the group of acoustic sources distributed across the platforms.

In these embodiments, members of the group of platforms may share respective range information with each other. In this regard, the respective range information may be collected by a master platform among the group of platforms. The master platform is arranged with a platform processor programmed to determine a position of the non-cooperative target in the first coordinate frame triangulation. The master platform is configured to communicate the location of the non-cooperative target to a cooperative target.

The cooperative target is arranged with a controller. The controller using the location of the non-cooperative target as identified by the master platform generates a control signal for directing the cooperative target with respect to the non-cooperative target.

Frame Projection with Ranging Sensors Processing Off Platform

In a separate arrangement a group of platforms are equipped with respective ranging sensors and a cooperative target processes signals to identify the location of the non-cooperative target in the first coordinate system. In this separate arrangement, a coordinate frame defined by the positions of antenna-transmitters on the group of platforms spatially separated from each other, is projected beyond the platforms using the ranging sensors which operate by determining a time of arrival of a reflected version of a known signal transmitted from the group of platforms. The ranging sensors may include sensors operating in the radio-frequency, visible, or infrared regions of the electromagnetic spectrum. When using ranging sensors, a second coordinate frame, defined by spatial relationships of antenna-receivers located in known positions on the platform, are not required to project a separate and distinct third coordinate frame defined by the locations of the group of platforms. As described, each platform determines its location in the coordinate frame defined by the antenna-transmitters associated with the spatially distributed antennas when those transmitters transmit uniquely identifiable signals.

With this arrangement, members of the group of platforms may provide respective information signals to a cooperative target. A cooperative target processor uses the information signals which include the location of each respective platform in the first coordinate frame and a distance between the platform and non-cooperative target to determine a position of the non-cooperative target in the first coordinate frame. The cooperative target processor may determine a position of the non-cooperative target based on a common path of the reflected versions of the platform unique signals.

Frame Projection with Ranging Sensors and Master Platform Processing

In an alternative embodiment, members of the group of platforms may share respective information signals concerning their location and a respective distance to the non-cooperative target with a master platform that collects the signals and communicates the collected signals to the cooperative target. In this embodiment, non-cooperative target position is determined using trilateration on the master platform. When trilateration capable processors are deployed, a single transformation from the constellation coordinate frame to the first coordinate frame enables an effective and accurate extension of the operating range of the engagement systems.

As described, a controller located on the cooperative target is programmed to generate a control signal responsive to the locations of the platforms and the respective distances from each platform to the non-cooperative target for directing the cooperative target relative to the non-cooperative target.

The aspects defined above and further aspects of the arrangements and methods for projecting reference frames are apparent from the illustrated examples to be described hereinafter and are explained with reference to these illustrated examples.

DETAILED DESCRIPTION OF ILLUSTRATED EMBODIMENTS

Figure 1:
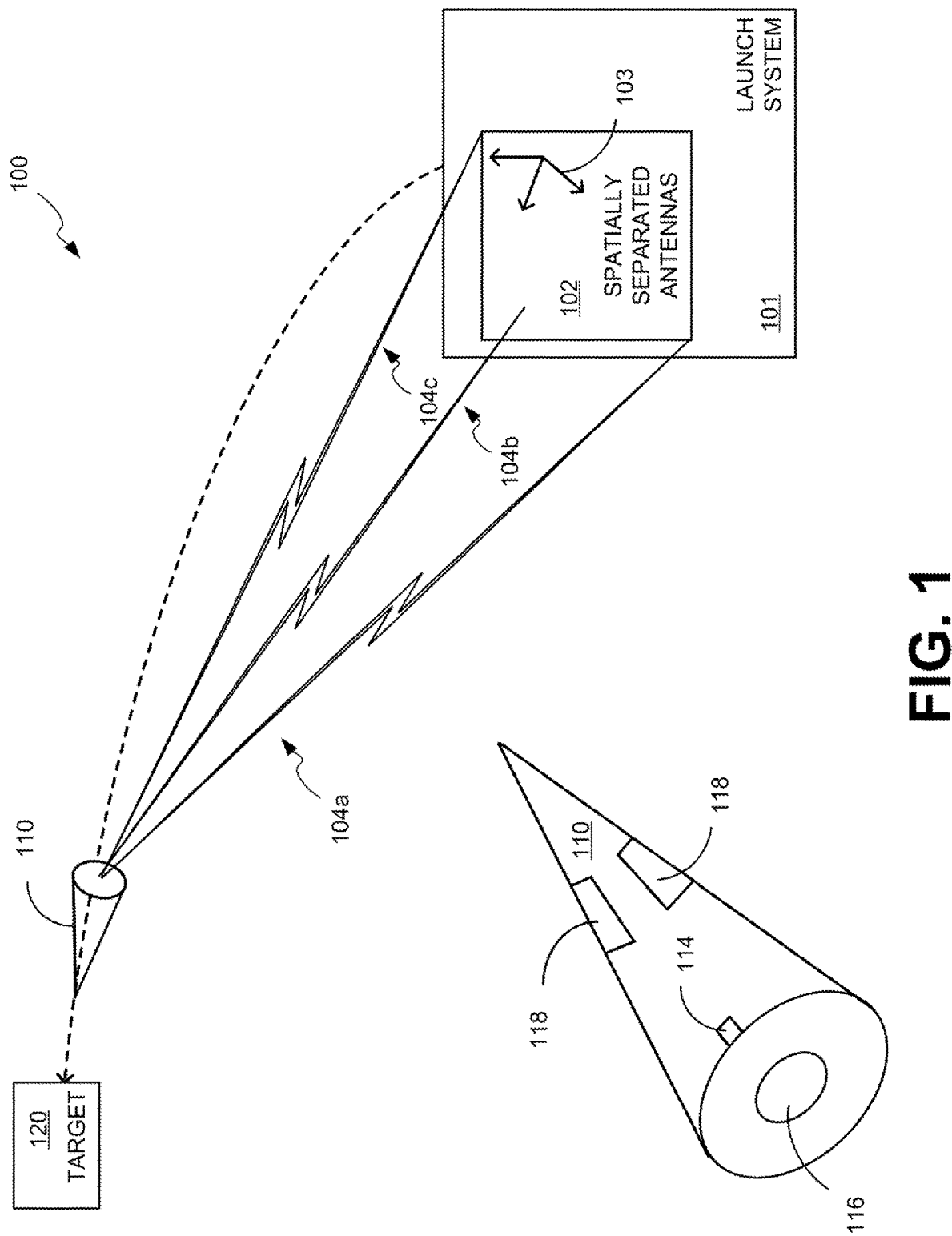
FIG. 1 shows an example of 3PS positioning and orientation applied to a direct fire weapon system.

The illustrations in the drawings are schematically presented. In different drawings, similar or identical elements are provided with the same reference signs.

Before, referring to the drawings, exemplary embodiments will be described in further detail, some basic considerations will be summarized based on which exemplary embodiments of the invention have been developed.

As described, a GPS uses multi-lateration techniques from multiple satellites with known accurate ephemeris. A multi-lateration system requires that the transmit antennas be separated by large distances (several kilometers) to avoid geometric dilution of precision (GDOP) issues and achieve sufficient accuracy. The large baseline of transmit antennas prohibits multi-lateration being used as a local non-GPS positioning technology due to GDOP issues and the need to protect widely spaced transmit antennas.

In contrast with GPS type multi-lateration positioning systems, bistatic interferometry allows the transmit antennas to be located closer together (within a few meters) which allows a precision pulse positioning system (3PS) to avoid GDOP and protection issues and provides enhanced positioning accuracy.

Orientation of a platform is determined using multiple bistatic receivers located on the platform to determined roll, pitch, and yaw of the platform in the 3PS frame (i.e., a first coordinate frame) that can be transformed into the platform body frame (i.e., a second coordinate frame) for navigation purposes. All airborne platforms are designed with one or more axes of symmetry to facilitate flight. To determine platform orientation, a 3PS takes advantage of these symmetries to locate 3PS bistatic receivers on the platform to maximize the observability of roll, pitch, and yaw. FIG. 1 shows an example of 3PS positioning and orientation applied to a direct fire weapon. A 3PS orientation capability for a projectile can be developed using phase, voltage, and polarization measurements from one or more receive antennas located in the base of the projectile. Whereas roll estimation can be achieved with sufficient accuracy using antennas in the base, pitch and yaw cannot. To achieve sufficient pitch and yaw accuracy an additional receiver is required on or near the front (or bow) of the projectile which takes advantage of the projectile body axis symmetry. Other fixed wing assets such as unmanned aerial vehicles (UAVs) have symmetries based on fuselage and wing positioning where antennas can be located for orientation determination. Non-fixed wing assets (e.g., multiple rotor drones, projectiles, missiles) may be arranged with separated antenna-receivers along a body axis with one or more additional antenna receivers placed along a second axis orthogonal to the body axis.

For NLOS applications a constellation of one to four UAVs whose precise positions are determined by a 3PS illuminator located on the ground or on another platform with accurate known coordinates in WGS 84 or another inertial frame may be deployed. The 3PS illuminator (an array of spatially separated transmitters) will create an energy field that illuminates all UAVs in the constellation. Each UAV in the constellation will self-locate its position in the 3PS frame (i.e., a first coordinate frame). Each UAV will use an RF repeater to repeat one or more of the unique 3PS waveforms forward or use an integrated transmitter to forward the one of the unique 3PS waveforms or a platform unique signal. The constellation of UAVs will recreate a secondary, airborne transmitter system that can provide a position and orientation functionality over-the-horizon using time-of-arrival (TOA) or time-difference-of-arrival (TDOA). The relative locations of the forward transmit antennas are determined using 3PS positioning applied to the one or more antennas that are designed with a companion receive antenna. Alternatively, the platforms or UAVs may be arranged with a sensor or array of sensors to determine an angle from the position of other UAVs or platforms from the group of platforms. The UAV transmit antenna locations will be communicated to each over-the-horizon objective platform using orthogonal waveforms to enable self-positioning and orientation. Since 3PS mitigates GDOP issues with relatively closely spaced transmit antennas, a single airborne platform (large UAV or fixed wing aircraft) can be used to project forward the 3PS coordinate frame where the multiple transmit antennas can be located on the UAV wings and/or fuselage to achieve a sufficient bistatic interferometry baseline for 3PS accuracy depending on the RF frequency.

The 3PS approach can simultaneously determine the position and orientation of multiple platforms provided that all platforms are in a radiation beam of the transmitter system. The Precision Pulse Positioning and Orientation System (3POS) approach uses a distributed transmit antenna configuration consisting of three distinct antennas that transmit orthogonal waveforms that are unique to each antenna (e.g., using Kasami or polyphase codes). This technique is implemented with physically separated antennas, such as distributed aperture radars or transmit-only antennas, to provide a stand-alone low-cost implementation with wide-area coverage. The accuracy of the 3POS system will depend upon the placement of the distributed apertures and the signal-to-noise ratio (SNR) of the radar signals at the platform. The reference frame for position and orientation is determined by the relative locations of the transmit antennas. The use of broad-beam antenna radiators or a phased-array radar with beam agility can provide the capability to determine the position and orientation for a significant number of platforms with minimal transmit power.

Waveform orthogonality can be achieved using diversity in frequency, phase, time, and even polarization or a combination of the four.

An embodiment of a method includes the steps of receiving with a constellation of platforms a set of uniquely identifiable signals transmitted from respective spatially distributed antennas separate from the constellation; defining a first coordinate frame with the location of the spatially distributed antennas; determining one or more of a position, a motion, and an orientation of each of the platforms in the first coordinate frame using one or more characteristics of the uniquely identified signals received by each of the platforms; generating a second coordinate frame responsive to the relative positions of respective antenna-receivers connected respective platforms; and generating, with a platform processor, a transformation from the second coordinate frame to the first coordinate frame.

The method, specifically the second coordinate frame, enables the platform processor to determine the orientation of the respective platform relative to the first coordinate frame using the transformation.

In an embodiment, the method further includes the steps of receiving, with at least one electro-optical sensor connected to a platform, one or more signals containing information about a position of a non-cooperative target; and communicating, from the platform to a cooperative target, information about the location of the non-cooperative target in the first coordinate frame defined by the spatially distributed antennas.

In an embodiment of the method, one or more sensors located on separate platforms receive respective signals used to determine angles to the non-cooperative target. The one or more sensors operate in the electromagnetic or acoustic spectrum.

In another embodiment of the method, members of the group of platforms share information related to positions of their respective antenna-receivers relative to the first coordinate frame. The shared information enables one or more members of the group of platforms to generate a third coordinate frame using the positions of the respective antenna-receivers of the group of platforms and transformation from the third coordinate frame to the first coordinate frame.

Further shared information concerns the location of the non-cooperative target in an established third coordinate frame relative to the first coordinate frame or in the first coordinate frame defined by the spatially distributed antennas by communicating information from one or more of the group of platforms to a master platform. In turn, the master platform can be arranged with a processor configured to determine the position of the non-cooperative target in the first coordinate frame using triangulation. Subsequently, the master platform may communicate the information about the non-cooperative target to a cooperative target. An appropriately configured cooperative target is arranged to generate a control signal responsive to the position of the non-cooperative target for directing the cooperative target relative to the non-cooperative target.

An embodiment of an alternative method includes the steps of receiving a set of uniquely identifiable signals transmitted from respective spatially distributed antennas separate from a constellation of platforms; defining a first coordinate frame using the location of the spatially distributed antennas; determining a position of a respective platform in the first coordinate frame using one or more characteristics of the uniquely identifiable signals received by the at least one antenna-receiver; determining a constellation coordinate frame defined by respective positions of antenna receivers on the group of platforms; generating, with the platform processor, a transformation from the constellation coordinate frame to the first coordinate frame; transmitting, with at least one ranging sensor transceiver connected to the respective platform, a respective platform unique signal; and receiving, with at least one ranging sensor receiver connected to the respective platform, a reflected version of the respective platform unique signal, wherein the reflected version of the platform unique signal is reflected from a non-cooperative target.

In this alternative method, members of the group of platforms determine a respective range to the non-cooperative target based on time of arrival of the reflected version of the respective platform unique signal. Alternatively, the group of platforms share range information with a master platform.

In an embodiment of this alternative method, members of the group of platforms provide respective signals to a cooperative target, a cooperative target processor determining a position of the cooperative target in the first coordinate frame using the coordinate transformation communicated to the cooperative target.

In an embodiment, the alternative method further includes determining, with the cooperative target processor located on the cooperative target, a position of the non-cooperative target in the first coordinate frame using the coordinate transformation communicated to the cooperative target.

In this further embodiment, the cooperative target processor determines a location of the non-cooperative target based on a common path of the reflected versions of the platform unique signals.

In this further embodiment the alternative method further includes generating, with a controller located on the cooperative target, a control signal for directing the cooperative target relative to the non-cooperative target.

In this alternative method, the group of platforms are configured to share their respective positions in the first coordinate frame. The shared information enables a master platform to determine a respective location of the cooperative target and of the non-cooperative target using trilateration. In turn, the master platform communicates the respective location of the cooperative target and of the non-cooperative target to the cooperative target.

Again, in either method or arrangement guidance of the cooperative target with respect to the non-cooperative target occurs in the first coordinate frame which is the only inertial frame. The second coordinate frame (of each respective) UAV or platform which is required for arrangements with platforms that use EO/IR sensors and processors that use triangulation is in motion relative to the first coordinate frame. The constellation coordinate frame defined by a group of platforms is in motion relative to the motion of the group of platforms with respect to the first coordinate frame.

The array of antennas that transmit unique waveforms defining the first coordinate frame enable the projection of the first coordinate frame forward to the platforms which deploy coordinate frame transformations and various applications to identify the location of a non-cooperative target over the horizon from the spatially separated antennas.

Distinction Between LOS and NLOS Applications

The applications of 3PS to platform position and orientation can be divided between applications where the 3PS transmitter system has line-of-sight (LOS) to the platform and where the objective or target is over the horizon (OTH) relative to the 3PS transmit system which is described as non-line of sight (NLOS). For LOS applications (see, e.g., FIG. 1) the 3PS transmitter directly illuminates the receiver antennas on the platform. Self-location of the projectile antennas is achieved using 3PS bistatic interferometry where accuracy is a function of the 3PS transmitter array baseline.

FIG. 1 shows an example of an operational LOS environment 100 where a launch system 101 has a direct line of sight to both a projectile 110 and a target 120. The launch system 101 may be a terrestrial vehicle such as a trailer, a manned vehicle such as an armored personnel carrier, jeep or even a tank arranged with one or more guns or devices capable of directing the projectile 110 along a path depicted in FIG. 1 as a dashed line from the launch system 101 in the general direction of the target 120. Target 120 is any aerial or terrestrial object.

Launch system 101 is arranged with spatially distributed antennas 102 or arrays of antenna elements that transmit a set of uniquely identifiable waveforms 104a-104c in the general direction of the projectile 110. As described, the uniquely identifiable waveforms 104a-104c are generated such that the waveforms are orthogonal with respect to each other in one or more of frequency, phase, time, polarization or combinations of these four waveform characteristics. The locations of the separated transmit antennas define a coordinate frame 103 which has a reference on the launch system 101.

In the illustrated embodiment, the projectile 110 is cone-shaped with a circular base and a continuous surface that extends in a tapering manner to a tip in a direction away from the circular base. The circular base is arranged with a patch antenna 116 which defines a roll axis that can be used to determine when the projectile 110 is rotating in a clockwise or anti-clockwise direction about the roll axis. A polarized antenna 114 is arranged along the continuous tapering surface of the projectile 110 proximal to the circular base. The polarized antenna 114 is provided to determine a roll rate of the projectile 110. Front antenna(s) 118 are provided further along the continuous tapering surface of the projectile 110 to determine pitch and yaw of the projectile with respect to the intended path of the projectile 110.

Figure 2:
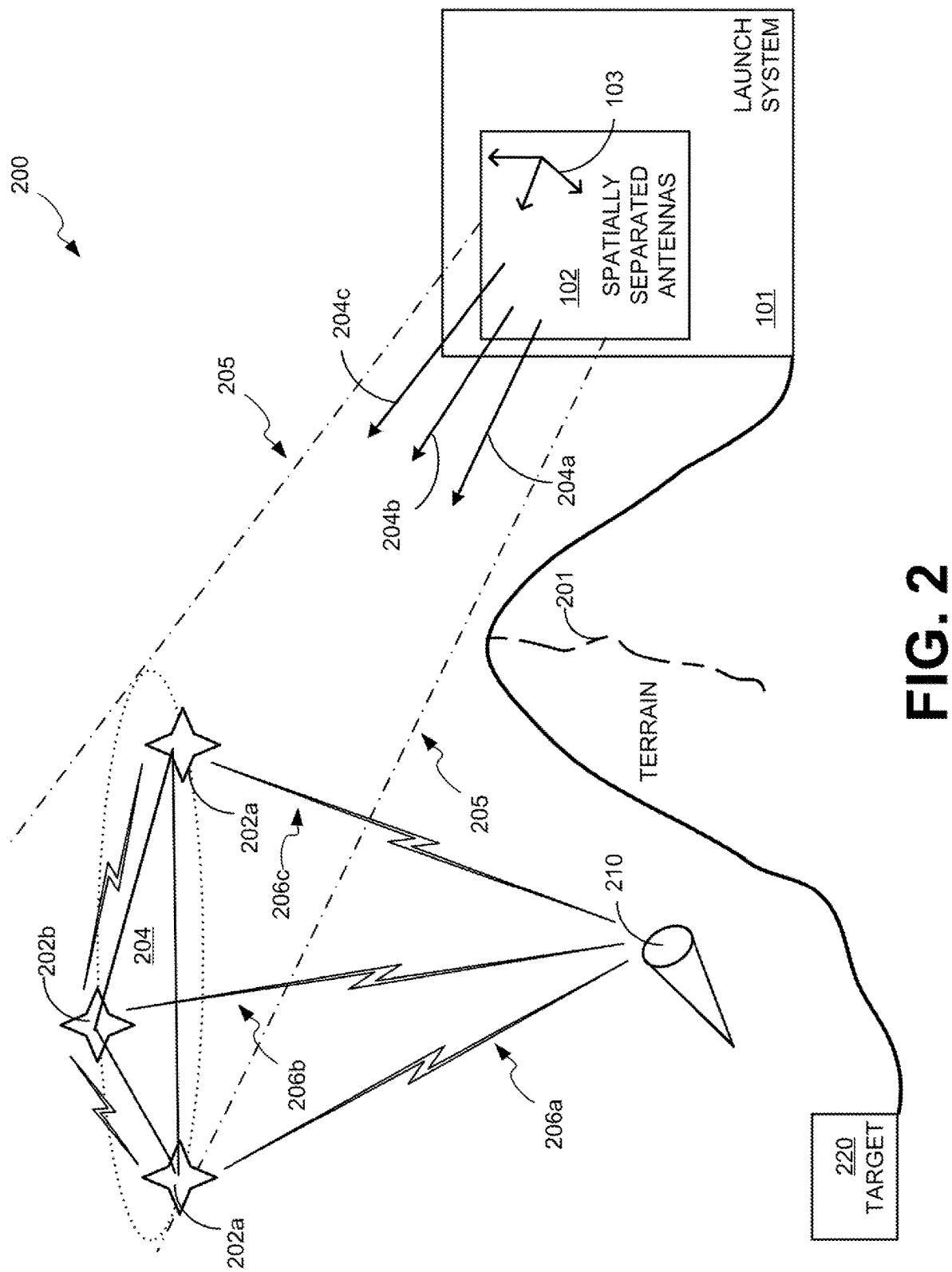
FIG. 2 shows a depiction of a constellation of UAVs or platforms projecting a ground based 3PS system forward to support a NLOS indirect fire mission.

For the NLOS applications the 3PS system is projected forward through a constellation of UAVs or platforms that is tactically positioned for enhanced accuracy of positioning signals that are communicated OTH. FIG. 2 includes an example embodiment of an operational NLOS environment 200 where a launch system 101 is unable to direct an illumination beam 205 that can reach a projectile 210 or the target 220. In this example, the launch system 101 is land based with terrain between the launch system 101 and both the projectile 210 and the target 220 as the terrain defining horizon 201 has a height that prevents the transmission of an illuminating beam 205 containing the uniquely identifiable signals 104a-104c in a manner that can intercept or communicate directly with the projectile 210.

FIG. 2 shows a depiction of a constellation of UAVs or platforms 202a, 202b strategically located above the target 220 and above the projectile 210 such that the constellation has a LOS to both. projecting a ground based 3PS system forward to support a NLOS indirect fire mission. This projected system is capable of implementing a time-of-arrival (TOA) positioning system similar to GPS, a time-difference-of-arrival (TDOA) positioning system, or a 3PS bistatic interferometer system depending on the nature of the Geometric Dilution of Precision (GDOP) of each method resulting from the location of the constellation relative to a non-cooperative object or another mission objective.

The ability to locate and position a constellation of UAVs 202a, 202b or other platforms will likely depend on whether secure airspace can be maintained over an area surrounding a target 220 and the size of the 3PS illumination beam 205 over the target 220. For long distances, the beam illumination area can be large allowing the constellation 202a, 202b to support many UAVs or platforms in the constellation which will support multi-lateration to guide a projectile 210 fired by the launch system 101 or a cooperating launch source. A good example is the application where the constellation is located directly above the area of interest to minimize GDOP effects.

As illustrated in FIG. 2, the relative position of the respective UAVs/platforms 202a, 202b define a geometric plane in the first coordinate frame. This geometric plane defines a constellation or second coordinate frame 204 that may be projected forward by a respective set of radiated orthogonal waveforms (or platform unique signals) 206a-206c. As described, the radiated orthogonal waveforms 206a-206c illuminate the projectile 210.

If air space is not controlled over the area of interest, then using projected 3PS into the area of interest will allow accuracy to be maintained using bistatic interferometry. The GDOP for bistatic interferometry is different than that for TOA and TDOA and can be minimized by implementing the transmitter system on a single airborne platform and placing the area of interest near the boresight of the antenna architecture defined by the location of the platform antennas.

Time Synchronization

For 3PS bistatic interferometry or multi-lateration to maintain accuracy it is necessary for time synchronization to be maintained throughout the network. Time synchronization is required to determine the range from the base 3PS system to the remote platform. The master clock is the 3PS clock for the base 3PS illumination system that is usually located on the ground to define a relative fixed inertial frame. For the LOS applications this means that time synchronization will be maintained between the master clock and those platforms that are within the LOS of the base system. Various methods of synchronizing clocks between ground-based 3PS illuminators and the gun-launched projectiles may be deployed.

For NLOS applications it is necessary to determine range from the base 3PS system to each UAV or platform in the constellation and then, projecting forward, to determine the range from each UAV or platform to the OTH objective targets. As such, time synchronization is more complex since time synchronization must be achieved with each UAV or platform in the constellation and with the objective cooperative targets that are illuminated by the array defined by the constellation (of UAV or platforms) transmit antennas. This projected 3PS or multi-lateration system requires that information is communicated throughout the network to optimize time synchronization.

Position and Orientation Estimation Performance

The position accuracy of objective platforms will depend upon the baseline architecture of the base 3PS system for LOS applications and, for NLOS applications, the distance between antenna-receivers as well. For the 3PS platform, position is defined by both range and angle, and typically angle accuracy is the more difficult to achieve. Angle accuracy is inversely proportional to the antenna baseline distance and the square root of signal-to-noise ratio (SNR). Thus, for long range missions, such as 30-50 km NLOS missions, the SNR and transmit baseline can be increased to accommodate required accuracies. The angle accuracy, $\sigma_\theta$, is given by, $$\sigma_\theta = \frac{\lambda}{2\pi D \cos(\theta)\sqrt{SNR}} \quad \text{Equation (1)}$$

and the cross-range accuracy at a range r from the 3PS transmitter array is $$\sigma_{CR} = r\sigma_\theta = \frac{r\lambda}{2\pi D \cos(\theta)\sqrt{SNR}} \quad \text{Equation (2)}$$

where θ is the angle measured from the 3PS array boresight, λ is the 3PS system wavelength, and D is the 3PS system baseline. For ranges at 30-50 km it will be necessary to use frequencies below 10 GHz to mitigate atmospheric effects. Assuming a 5 GHz frequency then λ=4.5 cm. For the projected 3PS system that uses UAVs or platforms the UAV antennas need to estimate to within a wavelength. Given atmospheric bending and a flat earth assumption, at 50 km range the altitude of the UAV or platform constellation can be 120 m or higher and still have line-of-sight to the 3PS transmit system absent interfering terrain.

Figure 3:
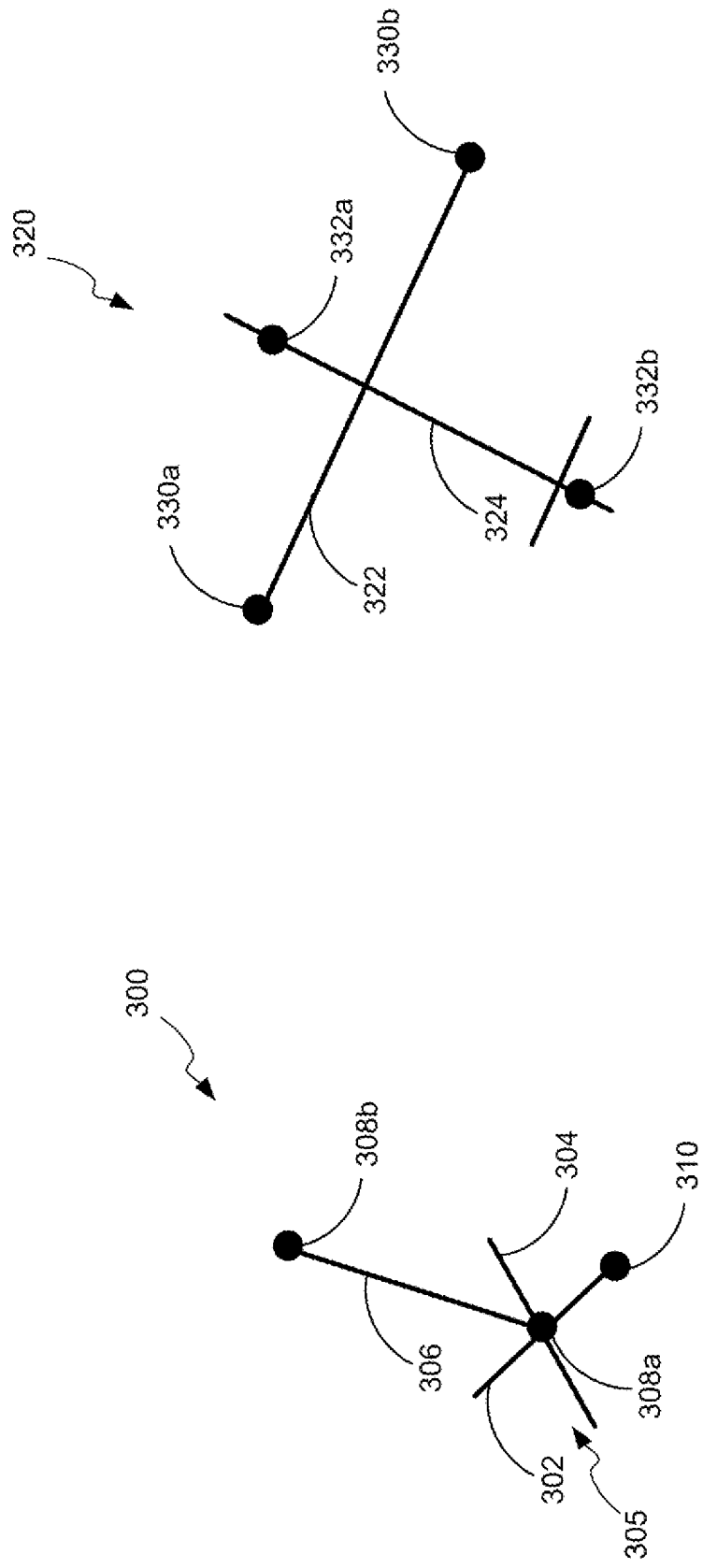
FIG. 3 shows examples of antennas located on axes of symmetry for a projectile and for fixed wing platforms.

FIG. 3 shows examples of antennas located on axes of symmetry for a projectile and for fixed wing platforms. More specifically, FIG. 3 axes of symmetry for a projectile coordinate frame 300 and for a UAV coordinate frame 320 for fixed wing platforms.

The projectile coordinate frame 300 is defined by an x-axis 302, a y-axis 304, and a z-axis 306 which extends from the x-y plane 305. Two antennas (depicted by solid circles in FIG. 3) are located along a body axis and removed from the body axis. A first body axis antenna 308a is located at the reference of the projectile coordinate frame 300. A second body axis antenna 308b is located proximal to the tip of the projectile. In the illustrated embodiment, the antenna 310 is located on the x-axis 302 at location proximal to the intersection of the base and the continuous tapering surface of a cone-shaped projectile. However, the antenna 310 may be located anywhere along the edge of the x-y plane 305 to maximize the accuracy of identifying the locations of these antennas in a first coordinate frame defined by a remotely located set of transmitters.

In the illustrated embodiment, a UAV coordinate frame 320 defines a wing axis 322 that intersects a fuselage axis 324 at a right angle. Wing antennas 330, again depicted by solid circles, include a left-side wing antenna 330a and a right-side wing antenna 330b. As shown, the wing antennas 330a, 330b are located proximal to the tip of the respective wing to maximize the accuracy of identifying the locations of the wing antennas in the first coordinate frame. Fuselage antennas 332a, 332b are located fore and aft of the wing axis 322.

Orientation accuracy depends upon the distances between receiver antennas located on the objective platform and the SNR. Let L be the distance from the rear antenna to the front antenna for one of the platforms in FIG. 3 let $\sigma_\theta$, denote the 3PS angle measurement accuracy as defined in Equation (1). Assuming that the angle accuracy is the same for both front and rear antennas, the orientation angle accuracy is given by the following, $$\sigma_r = \frac{\sqrt{2}\lambda r}{2\pi DL \cos(\theta)\sqrt{SNR}} = \frac{r}{\pi N_\lambda L \cos(\theta)\sqrt{2SNR}} \quad \text{Equation (3)}$$

where $N_\lambda$ is the baseline length in number of wavelengths. For the NLOS application projected through a UAV constellation 30 km at an altitude of 500 m, the sensitivity to achieve sub-degree orientation performance provides 12 cm of cross range accuracy. For reference, some military applications set a requirement of 2 m for cross range accuracy.

In-range performance is determined by the bandwidth (B) as follows:

$$\sigma_r = \frac{c}{B\sqrt{2SNR}} \quad \text{Equation (4)}$$

where c is the speed of light.

Figure 4:
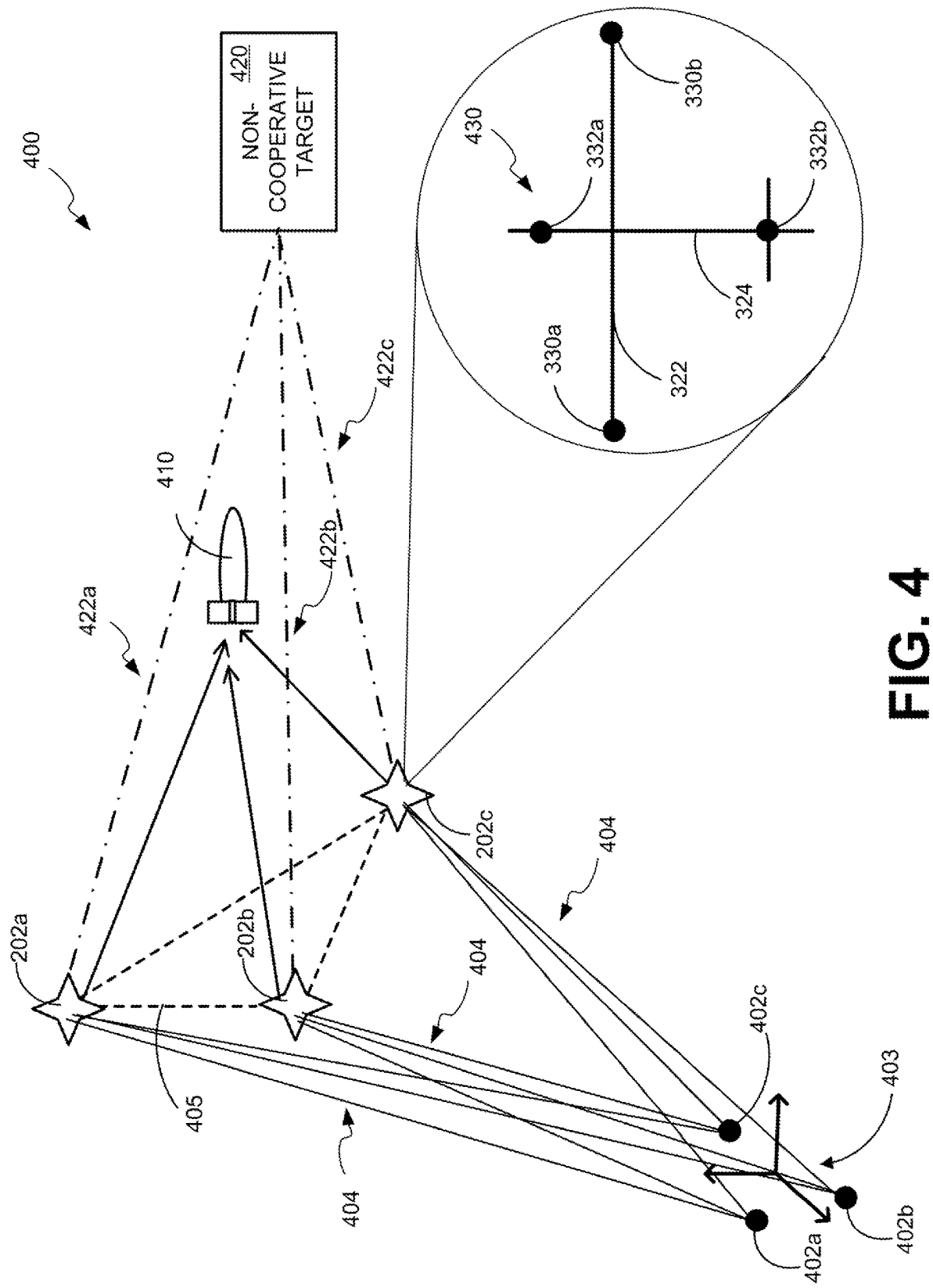
FIG. 4 shows an embodiment of a positioning system that projects a coordinate frame over the horizon using optical sensors on remote platforms.

FIG. 4 shows an embodiment of a positioning system in an operation NLOS arrangement 400 that projects a coordinate frame over the horizon using optical sensors on remote platforms 202a-202c depicted as four-point stars. A first coordinate frame 403 defined by spatially distributed antennas 402a-402c transmit a set of orthogonal waveforms 404. As illustrated, each of the antennas 402a-402c transmit an antenna unique waveform in the direction of the UAVs/remote platforms 202a-202c. Each UAV platform 202 includes one or more antenna-receivers that capture the radiated electromagnetic energy and convert the same into the set of uniquely identifiable signals. A respective platform processor uses time of arrival and/or time difference of arrival to self-determine its location in the first coordinate frame 403.

As shown in the detailed view in the lower right-hand portion of FIG. 4, when each of the UAVs/platforms 202a-202c are arranged as a fixed wing aircraft, the relative locations of the fuselage antennas 332a, 332b and the wing antennas 330a, 330b of each respective UAV/platform 202a-202c defines a second coordinate frame 430. This second coordinate frame 430 of the respective UAV/platform allow each UAV/platform 202a-202c (or any other craft that receives the location information) to determine the orientation of the fixed wing aircraft in the first coordinate frame 403.

The respective locations of the constellation of UAVs/platforms 202a-202c in the first coordinate frame 403 define a constellation coordinate frame 405 which is projected over the horizon toward cooperative target 410 and non-cooperative target 420.

Each UAV/platform 202a-202c is equipped with a sensor or sensors that determine angles with respect to the other UAVs/platforms 202a-202c as well as the non-cooperative target 420 and one or more cooperative targets 410. These sensors are sensitive to incident electromagnetic energy within a sensitivity band of electromagnetic spectrum that arrives at the sensor. Thus, these sensors may detect visible or non-visible light and heat energy emanating from the other platforms and targets within the sensitivity range of the sensor(s). These angles are defined with a sensor or sensors on a particular UAV/platform 202 being the apex of the angle with one vector extending from the UAV/platform detecting electromagnetic energy from a first platform/target and a second vector extending from the UAV/platform detecting electromagnetic energy from a second platform/target.

In the illustrated NLOS environment 400, the UAVs/platforms 202a-202c detect incident electromagnetic energy or EO/IR signals 422a-422c along respective vectors from non-cooperative target 420 with their respective angle determining sensors. In turn, the UAVs/platforms 202a-202c share their relative distance from the other members of the constellation of UAVs/platforms. A platform processor on one or more the UAVs/platforms 202a-202c uses the determined angles, their respective locations in the first coordinate frame 403 and their respective orientation as defined by the second coordinate frame 430 to determine the location of the non-cooperative target 420 in the first coordinate frame 403.

Figure 5:
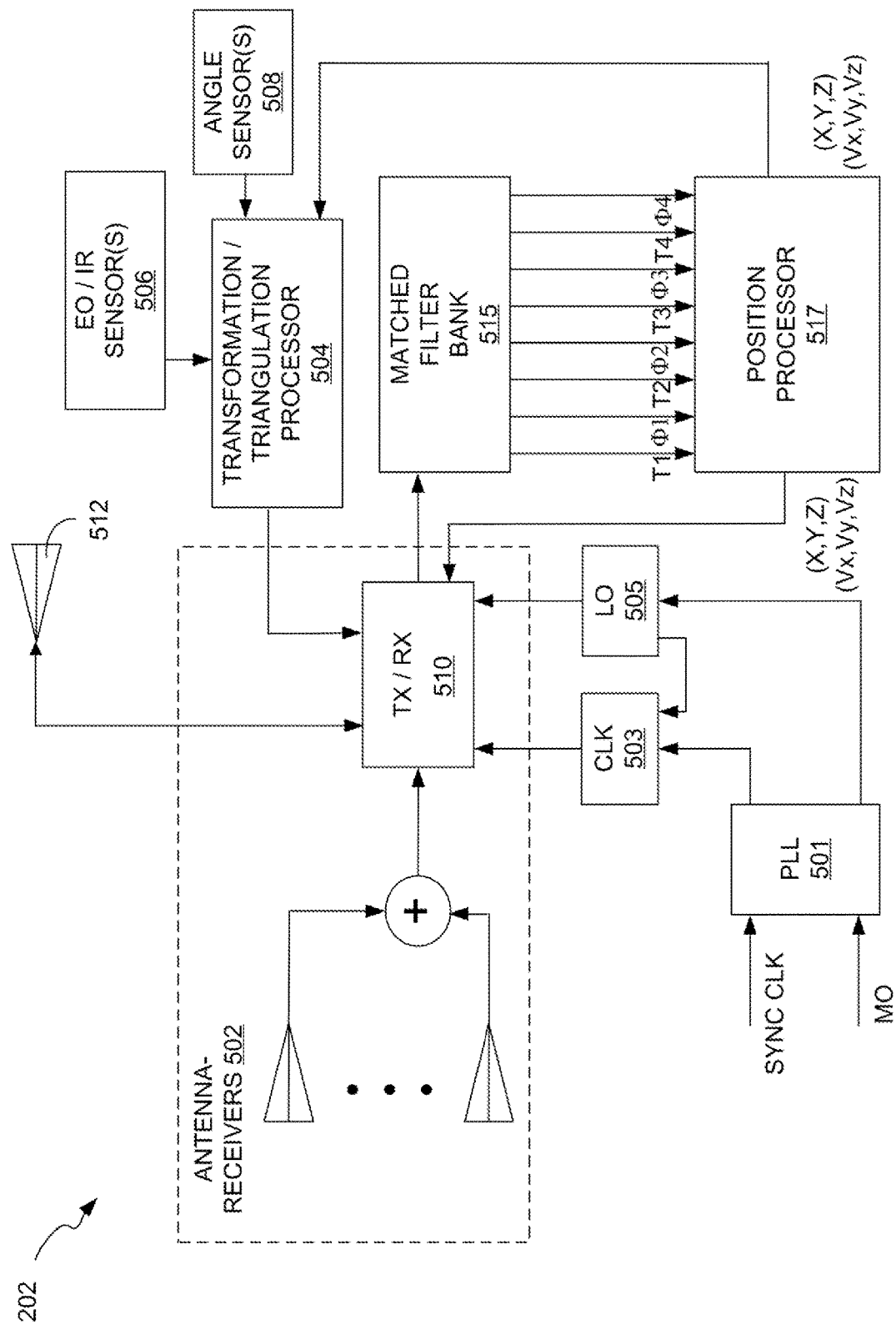
FIG. 5 illustrates an example embodiment of a platform in the positioning system of FIG. 4.

FIG. 5 illustrates an example embodiment of a UAV/platform 202 in the operational NLOS environment 400 of FIG. 4. As described, the positioning system in this embodiment determines angles between the members of the constellation of platforms and with respect to one or both of the non-cooperative target 420 and the cooperative target 410 and the UAVs/platforms 202a-202c. The angles between the UAVs/platforms 202a-202b define a geometric plane or third coordinate frame 405. The respective UAVs/platforms share both the measured angles and a distance between a respective UAV/platform and the remaining members of the constellation to complete the third coordinate frame 405. A transformation of the second coordinate frame 430 into the first coordinate frame 403 coupled with a transformation of the third coordinate frame 405 into the first coordinate frame as performed on each respective UAV/platform 202a-202c enables a projection of the first coordinate 403 over the horizon toward the cooperative target 410 and the non-cooperative target 420. Stated another, way, each UAV/platform 202a-202c determines its position in the first coordinate frame 403. The second coordinate frame 430 defined by the respective antenna locations on each respective UAV/platform 202a-202c enable each UAV/platform 202a-202c to determine a respective orientation in the first coordinate frame. The UAVs/platforms 202a-202c can use an incident angle of an IR sensitive sensor to determine an angle defined by a base defined by any two members of the UAVs/platforms 202 and the angle of incidence together with the third or constellation coordinate frame 405 to determine a location of the non-cooperative target 420 in the first coordinate frame 403. The calculated location of the non-cooperative target 420 is communicated to the cooperative platform 410.

The UAV/platform 202 is arranged with antenna-receivers 502 that operate in conjunction with a local oscillator 505, clock circuit 503, and a phase-locked loop (PLL) 501 to synchronize the operation of the transceiver 510 with the other system clocks. As illustrated, the PLL 501 receives a synch signal at a first input and a master oscillator signal from one or more of the transmit antennas of the spatially separated antennas. A matched filter bank 515 receives the time synched electrical versions of the orthogonal waveforms 104a-104c from the transceiver 510 and forwards a set of respective times and phase angles to the position processor which uses the information signals to generate a position and motion of the UAV/platform 202 in the first coordinate frame 403. The position and motion information is forwarded from the position processor 517 to the transceiver 510 which transmits a communication signal with the position information to the remaining UAVs/platforms of the constellation via the antenna 512.

The position and motion information in the first coordinate frame calculated in the position processor 517 is forwarded to the transformation/triangulation processor 504. In addition, respective position and motion information in the first coordinate frame 403 is received at antenna 512 and communicated from the transceiver 510 to the transformation/triangulation processor 504. As further illustrated in FIG. 5, respective information signals from EO/IR sensors 506 the angle sensor(s) 508 are forwarded to the transformation/triangulation processor 504. In turn, the transformation/triangulation processor 504 generates a transformation from the second coordinate frame 430 to the first coordinate frame 403 and a separate transformation from the third coordinate frame 405 to the first coordinate frame 403.

Information signals from the angle sensor(s) 508 and EO/IR sensors is also forwarded to the transformation/triangulation processor 504 which identifies at least three triangles with respective bases along a vector between two UAVs/platforms 202a-202c and an opposing angle at the intersection of vectors determined from received EO/IR sensitive sensors on the two UAVs/platforms 202a-202c forming the base. The at least three triangles identify the location of the non-cooperative target 420 in the first coordinate frame 403. In turn, the location of the non-cooperative target 420 is forwarded in an information signal from one or more of the UAVs/platforms 202a-202c.

Figure 6:
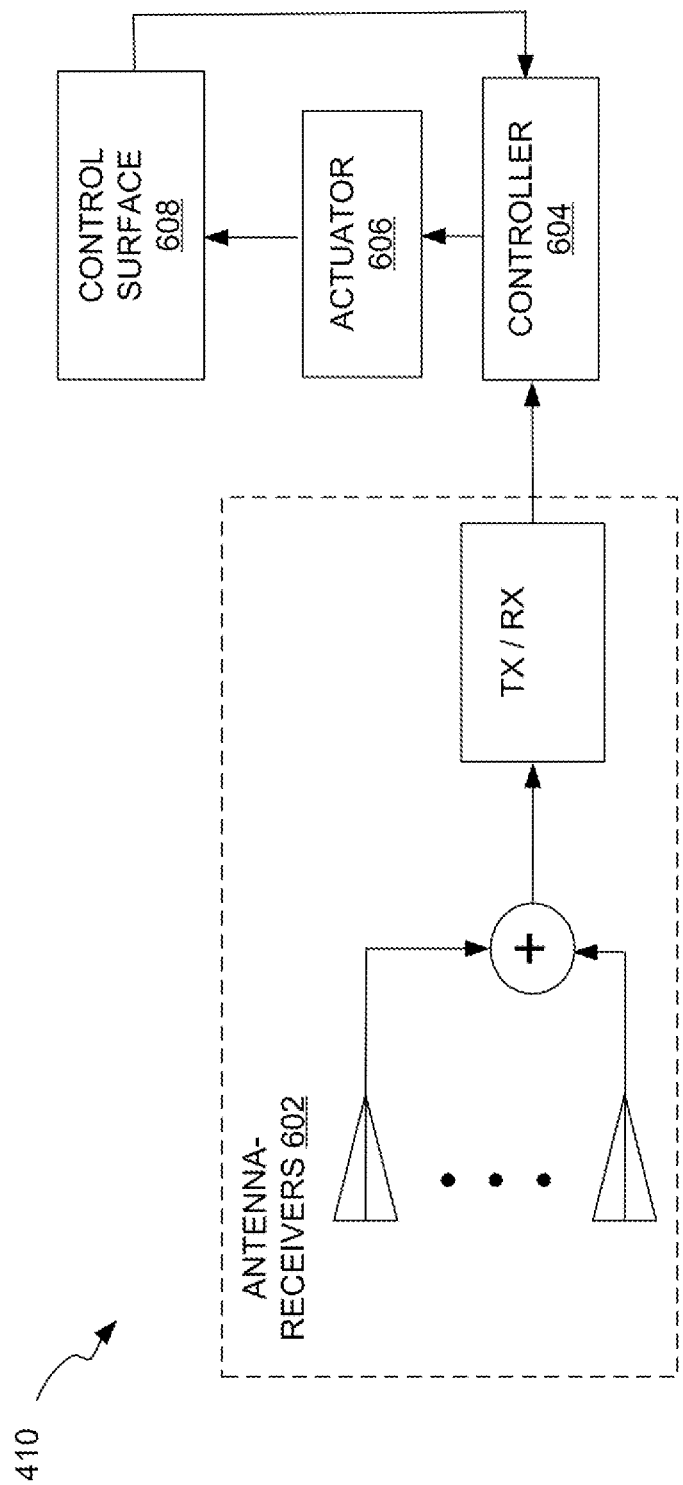
FIG. 6 illustrates an example embodiment of a cooperative target in the positioning system of FIG. 4.

FIG. 6 illustrates an example embodiment of a cooperative target 410 in the operational NLOS environment 400 using the positioning system of FIG. 4. As illustrated, the cooperative target 410 is arranged with one or more antenna receivers 602 to ensure receipt of the information signals transmitted from one or more of the UAVs/platforms 202a-202c. The location of the non-cooperative target 420 in the first coordinate frame 403 as received in the information signals is forwarded to the controller 604 which is arranged to direct the cooperative target 410 relative to the location of the non-cooperative target 420. In this regard, the controller 604 generates a control signal used by the actuator 606 to position control surface 608 in a desired manner to direct the cooperative target 410 relative to the non-cooperative target 420.

Figure 7:
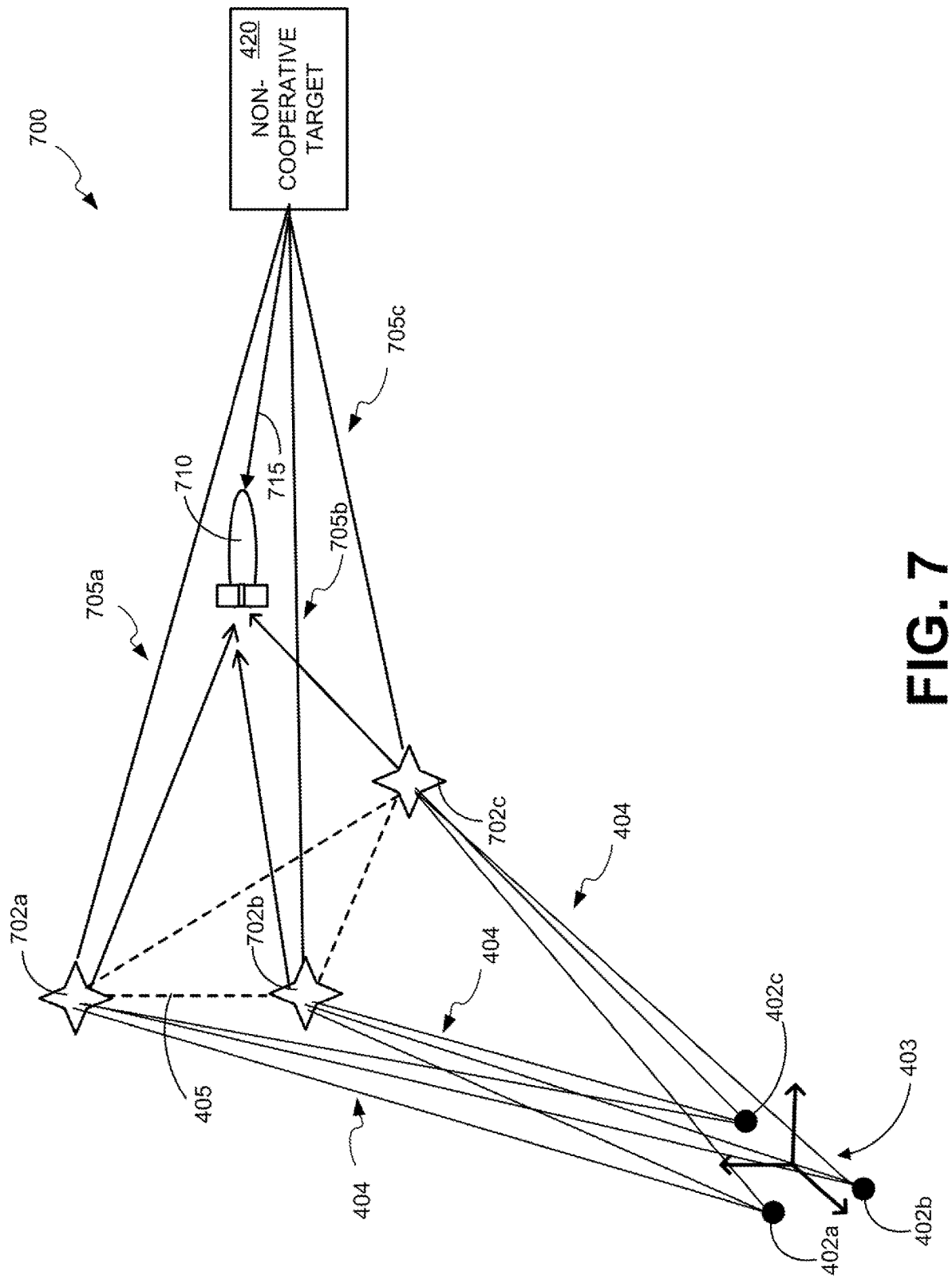
FIG. 7 shows an embodiment of a positioning system that projects a coordinate frame over the horizon using range sensors on the platforms with position processing performed off the platforms.

FIG. 7 shows an embodiment of a positioning system in an operational NLOS environment 700 that projects a coordinate frame over the horizon using range sensors on the platforms 702a-702c with position processing (of the non-cooperative target 420) performed off the platforms. A first coordinate frame 403 is defined by spatially distributed antennas 402a-402c that transmit a set of orthogonal waveforms 404 as previously described. Each UAV platform 702 includes one or more antenna-receivers that capture the radiated electromagnetic energy and convert the same into the set of uniquely identifiable signals. A respective platform processor uses time of arrival and/or time difference of arrival to self-determine its location in the first coordinate frame 403.

When the UAVs/platforms 702a-702c are arranged with ranging sensors as in FIG. 7 rather than the angle determining sensors in the NLOS positioning system depicted in FIG. 4, the respective UAV/platform orientation is not required. Therefore, there is no need to define a second coordinate frame based on the relative positions and locations of the antenna-receivers on the UAVs/platforms 702a-702c.

The respective locations of the constellation of UAVs/platforms 702a-702c in the first coordinate frame 403 define a constellation coordinate frame 405 which is projected over the horizon toward cooperative target 710 and non-cooperative target 420.

In the arrangement illustrated in FIG. 7, each UAV/platform 702a-702c is equipped with a ranging sensor or sensors that determine distances with respect to the cooperative target 710 and the non-cooperative target 420. These ranging sensors are sensitive to incident electromagnetic energy within a sensitivity band of electromagnetic spectrum that originates on the UAV/platform 702 is transmitted and reflected by the cooperative target 710 and/or the non-cooperative target 420 before arriving at the ranging sensor. Thus, these sensors may detect visible or non-visible light arranged with waveform unique characteristics that are sent from the respective platform and reflected by the target(s). These ranging sensors use a transmission time and time-of-arrival to determine a distance between the platform and the target.

In the illustrated NLOS environment 700, the UAVs/platforms 702a-702c detect incident reflected electromagnetic energy signals 705a-705c along respective vectors from non-cooperative target 420 with their respective ranging sensors. Each respective UAV/platform 702a-702c self-determines its location in the first coordinate frame 403 and communicates the location information and the respective distance from the non-cooperative target 420 to cooperative target 710.

A processor on the cooperative target 710 is programmed to use the respective location of the UAV/platforms 702a-702c and respective distances between the UAV/platforms 702a-702c along the vectors identified by the reflected versions of the platform unique signals 705a-705c and trilateration to determine the location of the non-cooperative target 420 in the first coordinate frame 403. The processor on the cooperative target 710 may be further programmed to use reflected versions of the platform unique signals 705a-705c that impinge the cooperative target 710 along a common reflected path 715 and the respective distance information from the UAVs/platforms 702a-702c to determine the location of the cooperative target 710 in the first coordinate frame 403.

Figure 8:
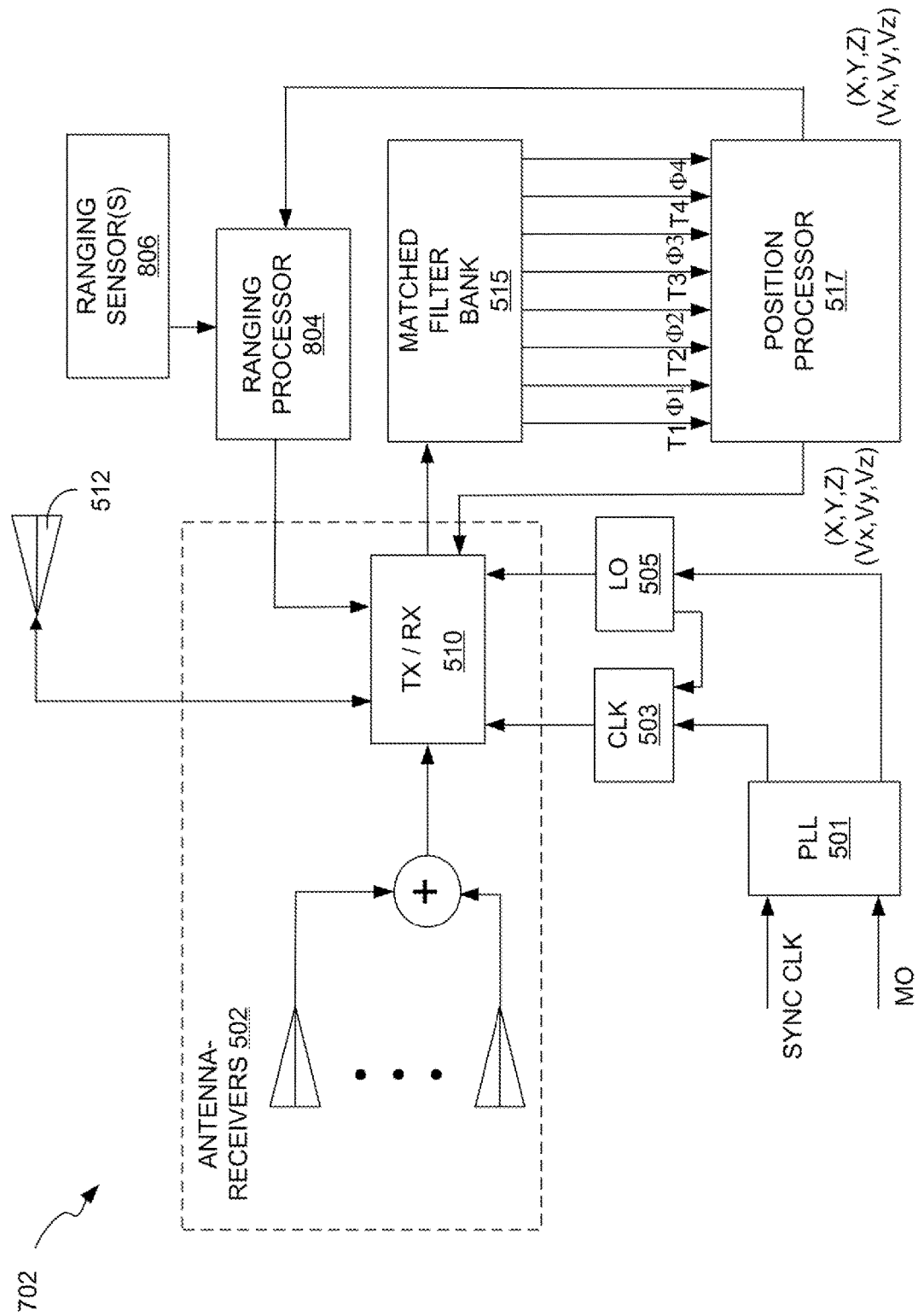
FIG. 8 illustrates an example embodiment of a platform in the positioning system of FIG. 7.

FIG. 8 illustrates an example embodiment of a UAV/platform 702 in the positioning system of FIG. 7. As described, the positioning system in this embodiment uses the respective location of each of the UAVs/platforms 702a-702c in the first coordinate frame 403 along with a respective distance from each of the UAVs/platforms 702a-702c to determine a location of the non-cooperative target 420. However, in this embodiment the ranging and location information is communicated from each of the UAVs/platforms 702a-702c to a cooperative target 710.

The UAV/platform 702 is arranged with antenna-receivers 502 that operate in conjunction with a local oscillator 505, clock circuit 503, and a phase-locked loop (PLL) 501 to synchronize the operation of the transceiver 510 with the other system clocks. As illustrated, the PLL 501 receives a synch signal at a first input and a master oscillator signal from one or more of the transmit antennas of the spatially separated antennas. A matched filter bank 515 receives the time synched electrical versions of the orthogonal waveforms 104a-104c from the transceiver 510 and forwards a set of respective times and phase angles to the position processor 517 which uses the information signals to generate a position and motion of the UAV/platform 702 in the first coordinate frame 403. The position and motion information are forwarded from the position processor 517 to the transceiver 510 which transmits a communication signal with the position information to the cooperative target 710 via the antenna 512.

Information signals from the ranging sensor(s) 806 are forwarded to ranging processor 804 which uses the synchronized clock, a transmit time and a time of arrival of a reflected version of a platform unique signal 705a-705c to calculate a range or distance from the UAV/platform 702 to the non-cooperative target 420. In turn, the location of the UAV/platform 702 and its distance to the non-cooperative target 420 is forwarded in an information signal from the transceiver 510 and antenna 512.

Figure 9:
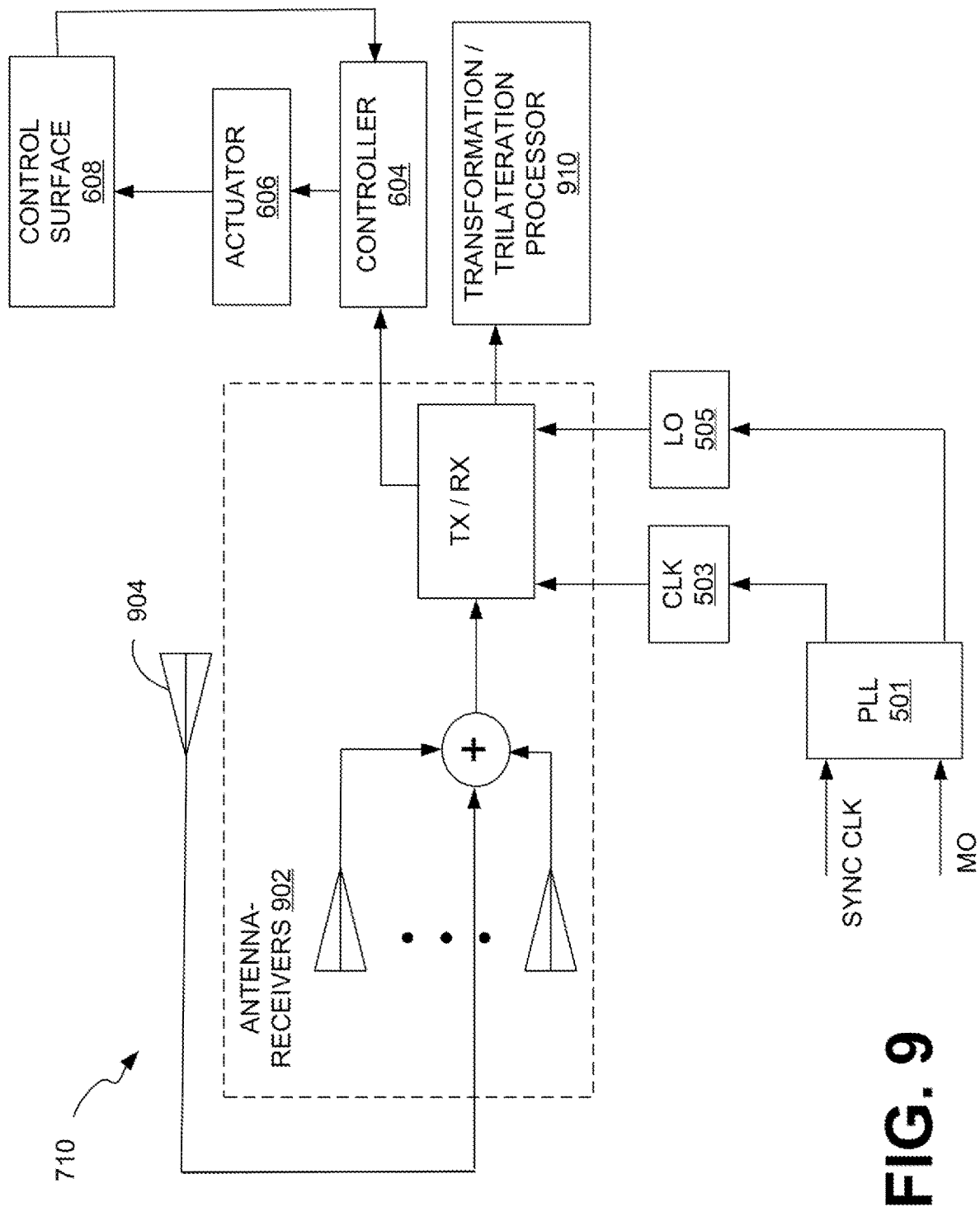
FIG. 9 illustrates an example embodiment of a cooperative target in the positioning system of FIG. 7.

FIG. 9 illustrates an example embodiment of a cooperative target 710 in the positioning system of FIG. 7. The cooperative target 710 is arranged with antenna-receivers 902 that operate in conjunction with a local oscillator 505, clock circuit 503, and a phase-locked loop (PLL) 501 to synchronize the operation of the transceiver 510 with the other system clocks. As illustrated, the PLL 501 receives a synch signal at a first input and a master oscillator signal from one or more of the transmit antennas of the spatially separated antennas. A transformation/trilateration processor 910 receives the respective information signals from the UAVs/platforms 702a-702c which signals include the location of the UAVs/platforms 702a-702c in the first coordinate frame 403 and the respective distances of the UAVs/platforms 702a-702c from the non-cooperative target 420.

In addition, reflected versions of the of the platform unique signals 705a-705c are received by antenna 904 and forwarded to the transformation/trilateration processor 910. In turn, transformation/trilateration processor 910 is programmed to perform a transformation from the third coordinate frame 405 to the first coordinate frame 403 and trilateration techniques with the information signals from the UAVs/platforms 702a-702c and a reflected common path of the respective platform unique signals 705a-705c to determine the location of the non-cooperative target 420 in the first coordinate frame 403.

Figure 10:
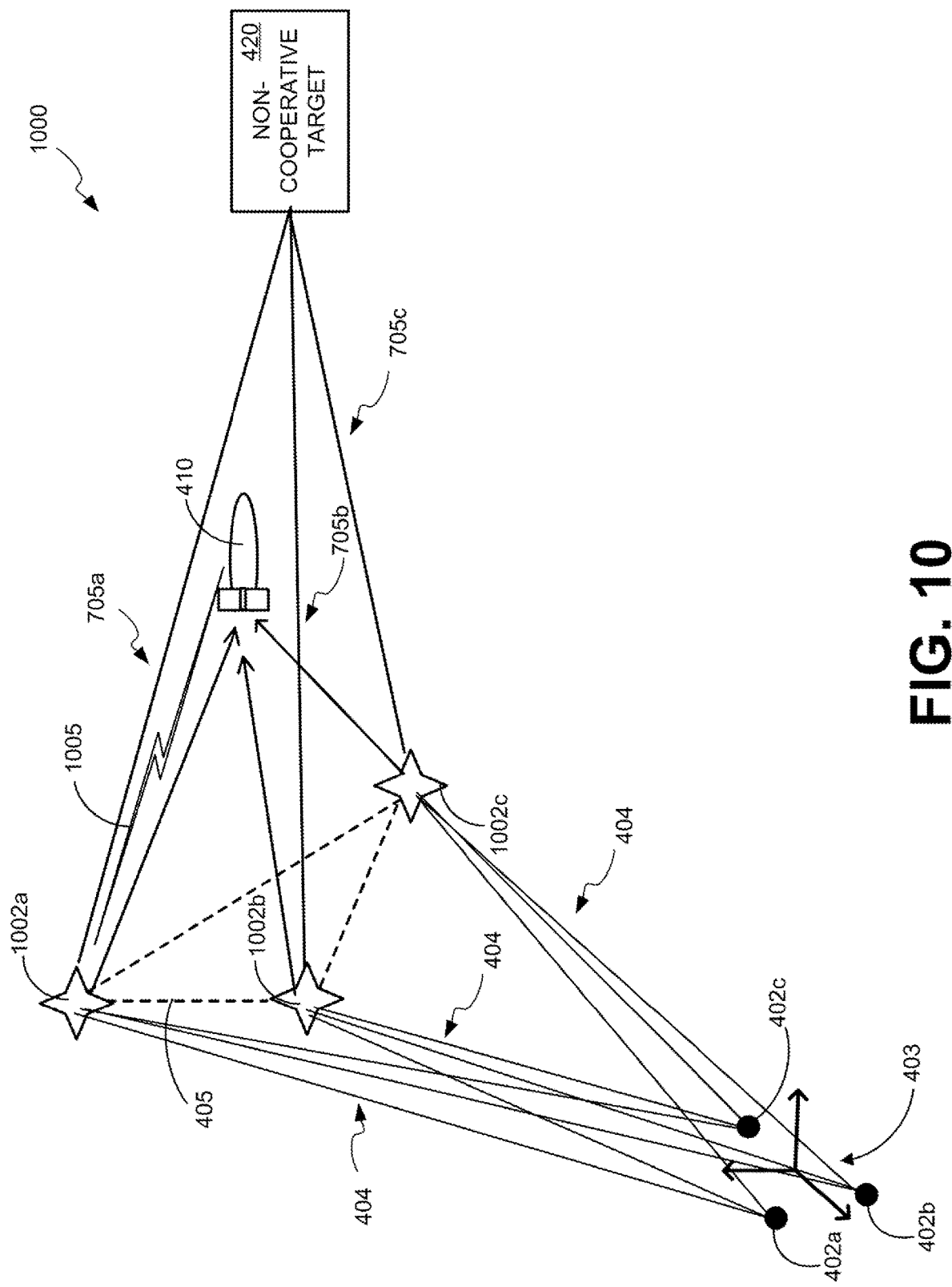
FIG. 10 shows an embodiment of a positioning system that projects a coordinate frame over the horizon using range sensors on the platforms with position processing performed on the platform(s).

FIG. 10 shows an embodiment of a positioning system in a NLOS environment 1000 that projects a coordinate frame over the horizon using range sensors on the platforms with position processing performed on the platform(s). In the arrangement illustrated in FIG. 7, each UAV/platform 1002a-1002c is equipped with a ranging sensor or sensors that determine distances with respect to the cooperative target 410 and the non-cooperative target 420. These ranging sensors are sensitive to incident electromagnetic energy within a sensitivity band of electromagnetic spectrum that originates on the UAV/platform 1002 is reflected by the cooperative target 410 and/or the non-cooperative target 420 before arriving at the ranging sensor. Thus, these sensors may detect visible or non-visible light or radio-frequency signals arranged with waveform unique characteristics that are sent from the respective platform and reflected by the target. These ranging sensors use a transmission time and time-of-arrival to determine a distance between the UAVs/platforms and the target.

In the illustrated NLOS environment 1000, the UAVs/platforms 1002a-1002c detect incident reflected electromagnetic energy signals 705a-705c along respective vectors from non-cooperative target 420 with their respective ranging sensors. Each respective UAV/platform 1002a-1002c self-determines its location in the first coordinate frame 403 and shares the location information and the respective distance from the non-cooperative target 420 with the other UAVs/platforms 1002a-1002c or with a designated master platform selected from the constellation or group of UAVs/platforms 1002a-1002c.

A transformation/trilateration processor 1104 on the UAVs/platforms 1002a-1002c is programmed to use the respective locations of the UAV/platforms 1002a-1002c and the respective distances between the UAV/platforms 1002a-1002c and non-cooperative target 420 along the vectors identified by the reflected versions of the platform unique signals 705a-705c to determine the location of the non-cooperative target 420 in the first coordinate frame 403. As illustrated in FIG. 10, a master UAV/platform 1002a establishes a data link 1005 with the cooperative target 410 to communicate the location of the non-cooperative target 420 in the first coordinate frame 403. Alternatively, when a master platform is not designated, each of the UAVs/platforms 1002a-1002c will communicate their location in the first coordinate frame 403 and their respective distance from the non-cooperative target 420 to the cooperative target 410.

Figure 11:
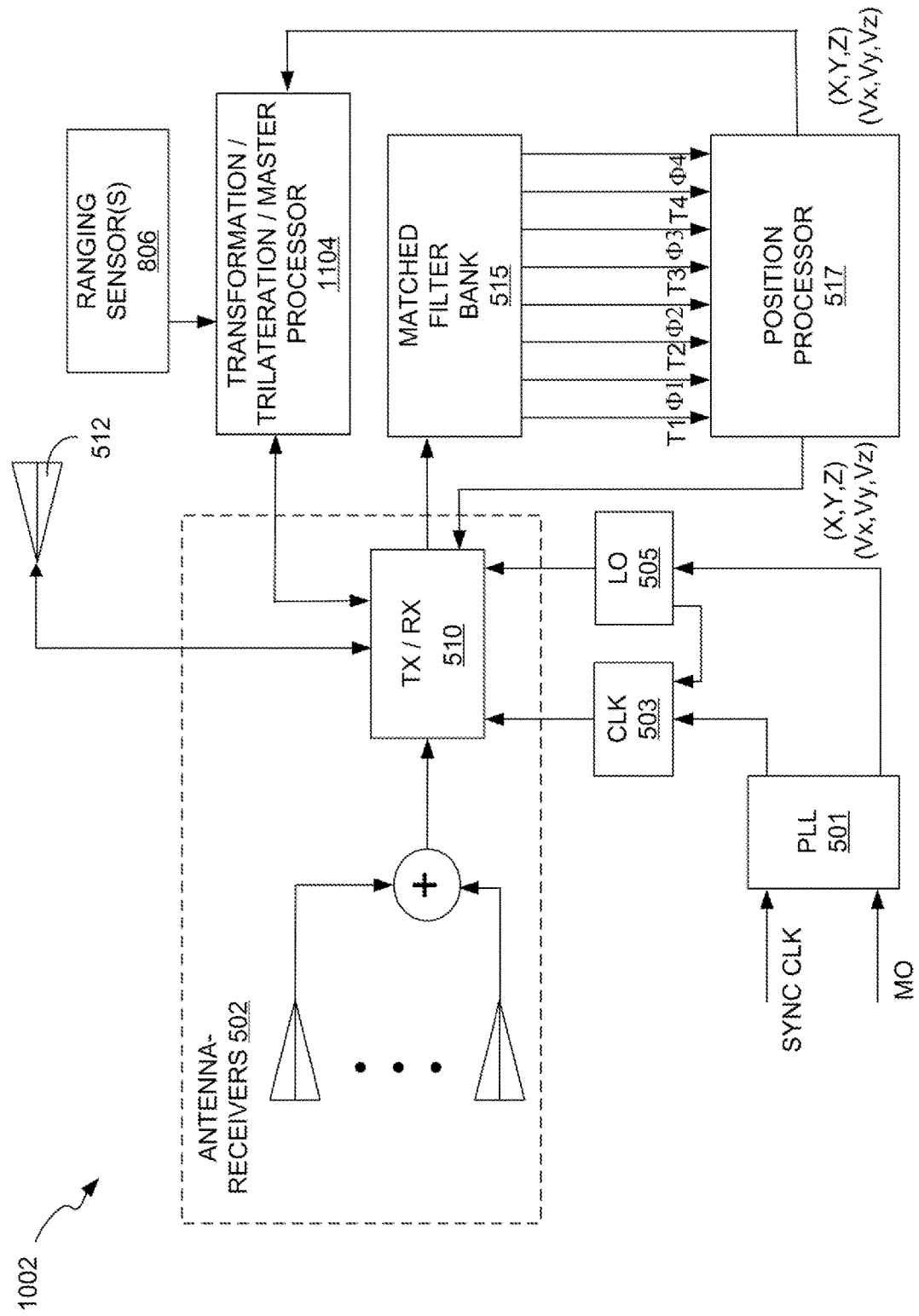
FIG. 11 illustrates an example embodiment of a platform in the positioning system of FIG. 10.

FIG. 11 illustrates an example embodiment of a UAV/platform 1002 in the positioning system of FIG. 10. As described, the positioning system in this embodiment uses the respective location of each of the UAVs/platforms 1002a-1002c in the first coordinate frame 403 along with a respective distance from each of the UAVs/platforms 1002a-1002c to determine a location of the non-cooperative target 420. However, in this embodiment the transformation and determination of the location of the non-cooperative target 420 are processed on one or more the UAVs/platforms 1002a-1002c and communicated via a data link 1005 to cooperative target 410.

The UAV/platform 1002 is arranged with antenna-receivers 502 that operate in conjunction with a local oscillator 505, clock circuit 503, and a phase-locked loop (PLL) 501 to synchronize the operation of the transceiver 510 with the other system clocks. As illustrated, the PLL 501 receives a synch signal at a first input and a master oscillator signal from one or more of the transmit antennas of the spatially separated antennas. A matched filter bank 515 receives the time synched electrical versions of the orthogonal waveforms 104a-104c from the transceiver 510 and forwards a set of respective times and phase angles to the position processor 517 which uses the information signals to generate a position and motion of the UAV/platform 1002 in the first coordinate frame 403. The position and motion information are forwarded from the position processor 517 to the transformation/trilateration processor 1104 which transforms the third coordinate frame 405 into the first coordinate frame 403 and calculates the location of the non-cooperative target 420 in the first coordinate frame 403.

Information signals from the ranging sensor(s) 806 are forwarded to transformation/trilateration processor 1104 which uses the synchronized clock, a transmit time, and a time of arrival of a reflected version of a platform unique signal 705a-705c to calculate a range or distance from the UAV/platform 1002 to the non-cooperative target 420. In turn, the location of the UAV/platform 1002 and its distance to the non-cooperative target 420 is forwarded in an information signal from the transceiver 510 and antenna 512. This information signal may be forwarded via transceiver 510 and antenna 512 to a designated master platform which communicates with the cooperative target 410 or with one or more of the remaining UAVs/platforms 1002.

It should be noted that the term "comprising" does not exclude other elements or steps and the article "a" or "an" does not exclude a plurality. Also, elements described in association with different arrangements may be combined.

Implementation of the invention is not limited to the preferred embodiments shown in the figures and described above. Instead, a multiplicity of variants are possible which variants use the solutions shown and the principle according to the invention even in the case of fundamentally different arrangements.

REFERENCE SIGNS

100 Operational LOS environment
101 Launch System (vehicle)
102 Spatially distributed antennas
103 First coordinate frame
104a-c Orthogonal (uniquely identifiable) waveforms
110 Projectile
114 Polarized antenna (roll-rate)
116 Patch antenna (roll axis)
118 Front antennas (pitch/yaw)
120 Target
200 Operational NLOS environment
201 Horizon
202a-c UAVs/platforms
202b Master platform
204 Second coordinate frame
205 Illumination beam
206a-c Radiated orthogonal waveforms
210 Projectile
220 Target
300 Projectile coordinate frame
302 X-axis
304 Y-axis
305 X-Y plane
306 Z-axis
308a-b Body-axis antennas
310 Antenna
320 UAV coordinate frame
322 Wing axis
324 Fuselage axis
330a-b Wing antennas
332a-b Fuselage antennas
400, 700, 1000 Operational NLOS environment
402a-c Spatially distributed antennas
403 First coordinate frame
404 Orthogonal waveforms
405 Constellation coordinate frame
410 Cooperative target
420 Non-cooperative target
422a-c Optical signals
430 Second coordinate frame
501 Phase-locked loop
502 Antenna-receiver(s)
503 Clock
504 Transformation/Triangulation processor
505 Local oscillator
506 Electro-optical/Infra-red sensor(s)
508 Angle sensor(s)
510 Transmitter/Receiver
512 Antenna
515 Matched filter bank
517 Position processor
602 Antenna-receiver(s)
604 Controller
606 Actuator
608 Control surface
702a-c UAV/platform
705a-c Platform unique signals
710 Cooperative target
715 Common-reflected path
804 Ranging processor
806 Ranging sensor(s)
902 Antenna-receivers
904 Antenna
910 Transformation/Trilateration processor
1002a-c UAV/platform
1005 Data link
1104 Transformation/Trilateration/Master processor

The invention claimed is:

1. A method, comprising:
receiving, with at least one antenna-receiver connected to a platform in a group of platforms, a set of uniquely identifiable signals transmitted from respective spatially distributed antennas separate from the platform;
defining a first coordinate frame using a location of the spatially distributed antennas;
determining, with a platform processor in communication with the at least one antenna-receiver, one or more of a position, a motion, and an orientation of the platform in the first coordinate frame, wherein the platform processor identifies at least one of the position, motion and orientation of the platform using one or more characteristics of the uniquely identifiable signals received by the at least one antenna-receiver;
generating, with the platform processor, a second coordinate frame responsive to relative positions of the at least one antenna-receiver connected to the platform and at least one additional antenna-receiver connected to the platform; and
generating, with the platform processor, a transformation from the second coordinate frame to the first coordinate frame.

2. The method of claim 1, where the second coordinate frame enables the platform processor to determine the orientation of the platform relative to the first coordinate frame using the transformation.

3. The method of claim 2, further comprising:
receiving, with at least one electro-optical sensor connected to a platform, one or more signals containing information about a position of a non-cooperative target; and
communicating, from the platform to a cooperative target, information about the position of the non-cooperative target in the first coordinate frame defined by the spatially distributed antennas.

4. The method of claim 1, wherein one or more sensors located on separate platforms receive respective signals used to determine angles to the non-cooperative target.

5. The method of claim 4, wherein the one or more sensors operate in the electromagnetic or acoustic spectrum.

6. The method of claim 1, wherein members of the group of platforms share information related to positions of their respective antenna-receivers relative to the first coordinate frame.

7. The method of claim 6, wherein one or more members of the group of platforms generate a third coordinate frame using the positions of the respective antenna-receivers of the group of platforms; and
generating, with the platform processor of one or more of the members of the group of platforms, a transformation from the third coordinate frame to the first coordinate frame.

8. The method of claim 7, wherein members of the group of platforms share information about a position of the non-cooperative target in an established third coordinate frame relative to the first coordinate frame or in the first coordinate frame defined by the spatially distributed antennas by communicating information from one or more of the group of platforms to a master platform.

9. The method of claim 8, wherein the master platform determines the position of the non-cooperative target in the first coordinate frame using triangulation.

10. The method of claim 8, further comprising:
receiving, at a cooperative target, a signal from the master platform with the information about the position of the non-cooperative target.

11. The method of claim 10, further comprising:
generating, with a controller located on the cooperative target, a control signal for directing the cooperative target relative to the non-cooperative target.

12. A method, comprising:
receiving, with at least one antenna-receiver connected to a respective platform of a group of platforms, a set of uniquely identifiable signals transmitted from respective spatially distributed antennas separate from the respective platform;
defining a first coordinate frame using a location of the spatially distributed antennas;
determining, with a platform processor in communication with the at least one antenna-receiver, a position of the respective platform in the first coordinate frame, wherein the platform processor identifies the position of the respective platform using one or more characteristics of the uniquely identifiable signals received by the at least one antenna-receiver;
determining, with a platform processor, a third coordinate frame defined by respective positions of the at least one antenna receiver on the group of platforms;
generating, with the platform processor, a transformation from the third coordinate frame to the first coordinate frame;
transmitting, with at least one ranging sensor transceiver connected to the respective platform, a respective platform unique signal; and
receiving, with at least one ranging sensor receiver connected to the respective platform, a reflected version of the respective platform unique signal, wherein the reflected version of the platform unique signal is reflected from a non-cooperative target.

13. The method of claim 12, wherein members of the group of platforms determine a respective range to the non-cooperative target based on time of arrival of the reflected version of the respective platform unique signal.

14. The method of claim 12, wherein members of the group of platforms provide respective signals to a cooperative target, a cooperative target processor determining a position of the cooperative target in the first coordinate frame using the coordinate transformation communicated to the cooperative target.

15. The method of claim 14, further comprising:
determining, with the cooperative target processor located on the cooperative target, a position of the non-cooperative target in the first coordinate frame using the coordinate transformation communicated to the cooperative target.

16. The method of claim 15, wherein the cooperative target processor determines the position of the non-cooperative target based on a common path of the reflected versions of the platform unique signals.

17. The method of claim 16, further comprising:
generating, with a controller located on the cooperative target, a control signal for directing the cooperative target relative to the non-cooperative target.

18. The method of claim 12, wherein the group of platforms share range information with a master platform.

19. The method of claim 18, wherein the group of platforms share their respective positions relative to the first coordinate frame.

20. The method of claim 19, wherein the master platform determines a respective location of a cooperative target and of the non-cooperative target using trilateration.

21. The method of claim 20, wherein the master platform communicates the respective location of the cooperative target and of the non-cooperative target to the cooperative target.

* * * * *